US010695997B2

(12) United States Patent
Balzer et al.

(10) Patent No.: US 10,695,997 B2
(45) Date of Patent: Jun. 30, 2020

(54) EXTENDED PLY POSE PROCESSES AND SYSTEMS AND DEVICES THEREFOR

(71) Applicant: Compagnie Generale des Etablissements Michelin, Clermont-Ferrand (FR)

(72) Inventors: Raymond Balzer, Easley, SC (US); Almira Aleckovic, Anderson, SC (US); Michael Petrovich, Simpsonville, SC (US); Eric Rivers, Greenville, SC (US); Larry Satterfield, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 248 days.

(21) Appl. No.: 15/737,018

(22) PCT Filed: Jun. 16, 2016

(86) PCT No.: PCT/US2016/037831
§ 371 (c)(1),
(2) Date: Dec. 15, 2017

(87) PCT Pub. No.: WO2016/205486
PCT Pub. Date: Dec. 22, 2016

(65) Prior Publication Data
US 2018/0361695 A1   Dec. 20, 2018

(30) Foreign Application Priority Data
Jun. 17, 2015  (WO) ............... PCT/US2015/036200

(51) Int. Cl.
*B29D 30/44* (2006.01)
*B29D 30/30* (2006.01)
*B29D 30/28* (2006.01)

(52) U.S. Cl.
CPC ............. *B29D 30/44* (2013.01); *B29D 30/28* (2013.01); *B29D 30/30* (2013.01); *B29D 2030/4493* (2013.01)

(58) Field of Classification Search
CPC ......................... B29D 2030/4493; B29D 30/44
See application file for complete search history.

(56) References Cited

U.S. PATENT DOCUMENTS 3,212,951 A * 10/1965 Porter .................. B29C 31/002
                                                           156/421.8
4,240,863 A    12/1980 Vinton
(Continued)

FOREIGN PATENT DOCUMENTS

EP      1775243 A2     4/2007
GB      1201240 A  *   8/1970 ............. B29D 30/46
(Continued)

OTHER PUBLICATIONS

European Patent Office; International Search Report and Written Opinion for patent application PCT/US2015/036200; dated Mar. 2, 2016; Publisher: European Patent Office, Rijswijk, Netherlands, pp. 1-11 enclosed.
(Continued)

*Primary Examiner* — Robert C Dye
*Assistant Examiner* — Alexander D Booth
(74) *Attorney, Agent, or Firm* — Neal P. Pierotti

(57) ABSTRACT

A transporter and a method are provided for retrieving at least one reinforcing ply and conforming the at least one reinforcing ply to a forming surface of a rotatable forming drum having one or more tire components disposed thereon.

16 Claims, 11 Drawing Sheets

(56) References Cited

U.S. PATENT DOCUMENTS

| | | | |
|---|---|---|---|
| 4,667,574 A * | 5/1987 | Felten | B29D 30/2607 |
| | | | 156/396 |
| 4,844,768 A | 7/1989 | Kimura | |
| 5,935,377 A | 8/1999 | Sergel | |
| 6,109,222 A | 8/2000 | Glezer | |
| 2006/0055190 A1 | 3/2006 | Iwasaki | |
| 2007/0289694 A1 | 12/2007 | Macheffe | |
| 2012/0111473 A1* | 5/2012 | Hasegawa | B29C 65/7847 |
| | | | 156/64 |
| 2015/0328853 A1 | 11/2015 | Denavit | |

FOREIGN PATENT DOCUMENTS

| | | | |
|---|---|---|---|
| WO | 2013093765 A1 | | 6/2013 |
| WO | WO-2014090983 A1 * | | 6/2014 |

OTHER PUBLICATIONS

European Patent Office; International Search Report and Written Opinion for patent application PCT/US2016/037831; dated Nov. 10, 2016; Publisher: European Patent Office, Rijswijk, Netherlands, pp. 1-11 enclosed.

* cited by examiner

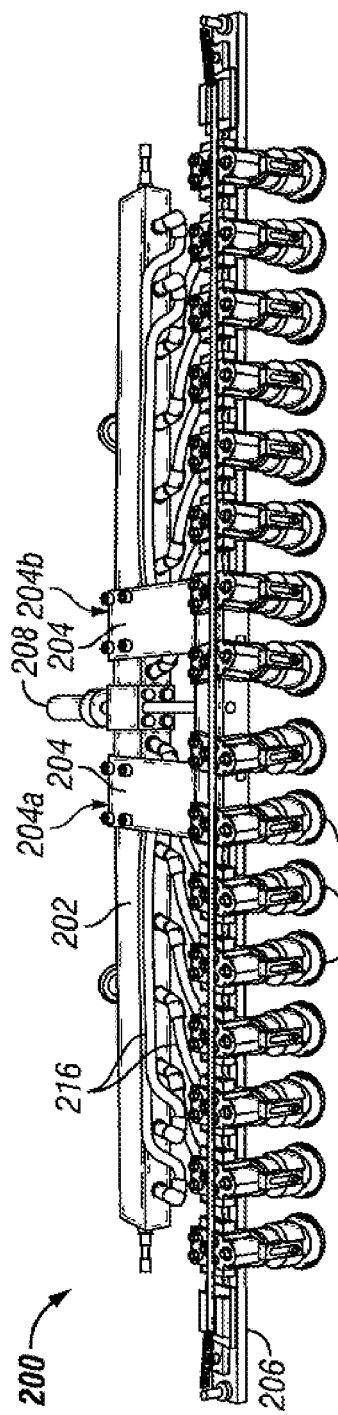
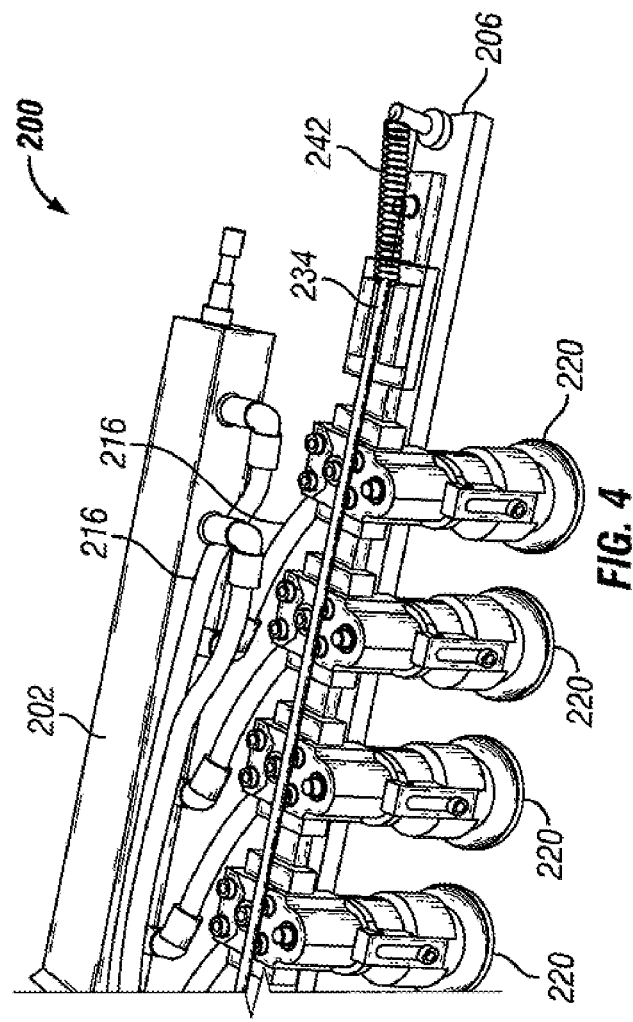
FIG. 3
FIG. 4

EXTENDED PLY POSE PROCESSES AND SYSTEMS AND DEVICES THEREFOR

CROSS-REFERENCE TO RELATED APPLICATION

The present application is a national stage entry of International Application Number PCT/US2016/037831 having an international filing date of Jun. 16, 2016 and which claims priority to International Application Number PCT/US2015/036200 which has an international filing date of Jun. 17, 2015. International Application Numbers PCT/US2016/037831 and PCT/US2015/036200 are incorporated by reference herein in their entireties for all purposes.

TECHNICAL FIELD

The presently disclosed invention relates generally to methods, devices and systems for manufacturing tires. More specifically, the presently disclosed invention is directed to predictable posing of one or more reinforcing plies during manufacture of self-supporting tire systems.

BACKGROUND

Tires are commonly manufactured from multiple layers and components that are placed sequentially onto a cylindrical drum. In some known techniques, a layer of air impermeable rubber is laid onto a forming surface of a drum, and one or more carcass plies are placed thereon. The terms "carcass ply," "carcass," "reinforcement ply" or "body ply" may each refer to a ply that extends between and from the bead portions on opposing sides of the tire, through the opposing sidewall portions, and across the crown portion of the tire. The body ply may include ferrous reinforcements. A pair of circular beads is placed on opposing drum sides and may include bead wires and bead fillers. After the plies are turned up and the beads moved towards each other to create a toroidal shape, a sidewall protective rubber and a tread portion are added.

It is well-known to adapt tire manufacturing techniques for the construction of self-supporting tire systems that include reinforced sidewalls (as used herein, "self-supporting tire system" and "self-supporting tire" may be used interchangeably). Such self-supporting tire systems, in supporting a vehicle upon loss of air pressure, permit continued vehicle operation up to a predetermined speed and distance (typically specified by the tire manufacturer). Self-supporting tire systems help drivers maintain control in the absence or near-absence of air pressure and work reliably with a variety of synergistic technologies, including but not limited to tire pressure monitoring systems (TPMS).

There are challenges associated with the manufacture of self-supporting tires, including those having reinforcements in the sidewalls. A forming drum having a generally cylindrical shape and a flat profile along the axial direction may also include recesses for accepting features such as circular beads. When reinforcements are presented onto the forming drum before a carcass ply or reinforcing ply is laid thereonto, the reinforcements create a profile that is no longer flat along the axial direction of the drum. Presentation of a carcass ply onto this uneven profile can result in undesirable creases or wrinkles, notably when attempting to press the carcass ply towards the forming drum to make contact with an air impermeable layer disposed thereon. Consequently, these creases may incur deradialization, that is, an undesirable orientation and positioning of cords and/or other reinforcing elements present in the reinforcing ply. Additionally, variance may occur in the overlap of the joint of the ply ends. Solutions to such challenges are provided by co-owned and co-pending international application number PCT/US2012/043456 for a METHOD FOR ADHERING AN INNERLINER TO A CARCASS PLY OF A TIRE, filed 21 Jun. 2012, the entire disclosure of which is incorporated by reference herein.

Complementary solutions for effective posing and assembling processes have been developed that accurately position each component of a self-supporting tire system relative to the reinforcements.

SUMMARY

A transporter is provided for retrieving at least one reinforcing ply and conforming the at least one reinforcing ply to a forming surface of a rotatable forming drum having axial and circumferential directions. The forming surface is coextensive with a pair of opposed sides and has one or more tire components disposed thereon. An exemplary transporter includes a manifold including one or more supply ports each having a supply port inlet in communication with a vacuum supply source, and a supply port outlet for delivery of a vacuum to one or more suction cup assemblies supported by an assembly support bar. Each suction cup assembly includes a suction cup in generally coaxial alignment with a suction cup retainer. Each suction cup is reciprocatably and translationally positionable between a ply retrieval position, in which the at least one reinforcing ply is retrieved from a generally even surface, and a ply pose position, in which the at least one reinforcing ply assumes a profile shape of the forming surface of the drum before posing of the at least one reinforcing ply on the one or more tire components.

In some embodiments, the transporter includes at least one conduit having opposed extents that establish fluid communication between each supply port outlet and at least one corresponding delivery fitting so as to actuate at least one suction cup assembly upon delivery of the vacuum thereto. In some embodiments, each suction cup assembly includes a slide shaft reciprocatingly accommodated within a slide housing and coaxially disposed relative to an extension spring that governs vertical motion of the suction cup. The vertical motion may be limited by an adjustable stop tab that engages at least a portion of the slide housing. In some embodiments, a pair of stops may be included that provide adjustment limits for the stop tab. The adjustment limits may be optionally preset to accommodate actuation of one or more suction cup assemblies between the ply retrieval position and the ply pose position.

In some embodiments, the transporter may be in signal communication with at least one programmable controller in which one or more profile shapes are programmed such that the ply pose position is selectable from a plurality of profile shapes.

A method of assembling tire components for the manufacture of self-supporting tires is also provided. In an exemplary method, one or more air impermeable layers are laid onto a forming surface of a rotatable forming drum having axial and circumferential directions and with the forming surface being coextensive with a pair of opposed sides. At least a pair of sidewall support inserts is positioned onto the one or more air impermeable layers with at least one sidewall support insert placed at a predetermined relative distance from each opposed side. At least one transporter as presently disclosed is provided for retrieving at least one reinforcing ply and placing the at least one reinforcing ply over the at least one pair of sidewall support inserts on the drum.

In some embodiments of the presently disclosed method, one or more posing cycles is performed for shaping and depositing the at least one reinforcing ply on the drum. A posing cycle may include providing a tension device having a plurality of tension values for selective application of a laying tension of the at least one reinforcing ply.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which:

FIG. 3 shows a top perspective view of an exemplary carcass ply transporter and FIG. 4 shows a partial top perspective view thereof.

DETAILED DESCRIPTION

Figure 1:
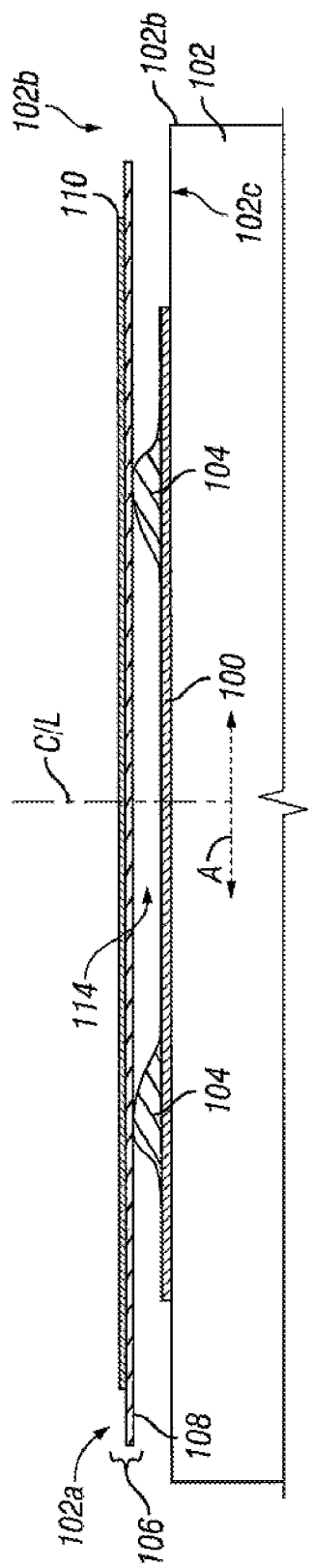
FIG. 1 shows a cross-sectional view of components of an exemplary self-supporting tire as presented to a forming drum as known in the prior art.

Reference now will be made in detail to embodiments of the presently disclosed invention, one or more examples of which are illustrated in the drawings. Each example is provided by way of explanation and not by limitation. It will be apparent to those skilled in the art that various modifications and variations can be made in the present invention without departing from the scope or spirit thereof. For instance, features illustrated or described as part of one embodiment can be used with one or more other embodiments to yield a still further embodiment. Thus, it is intended that the present invention covers such modifications and variations as come within the scope of the appended claims and their equivalents.

Now referring to the figures, wherein like numbers represent like elements, a user can initiate an exemplary method for forming a self-supporting tire as provided herein (although it is understood that the presently disclosed processes are suitable for production with any amenable self-supporting tire system). As used herein, a "user" may be a single user or one or more groups of users and may refer to any electronic apparatus configured for receiving control input and configured to send commands and/or data either interactively or automatically to other devices (including but not limited to user devices, client devices, network-connected devices and devices). As used herein, the term "process" or "method" may include one or more steps performed at least by one electronic or computer-based apparatus. Any sequence of steps is exemplary and is not intended to limit methods described herein to any particular sequence, nor is it intended to preclude adding steps, omitting steps, repeating steps or performing steps simultaneously.

Figure 2:
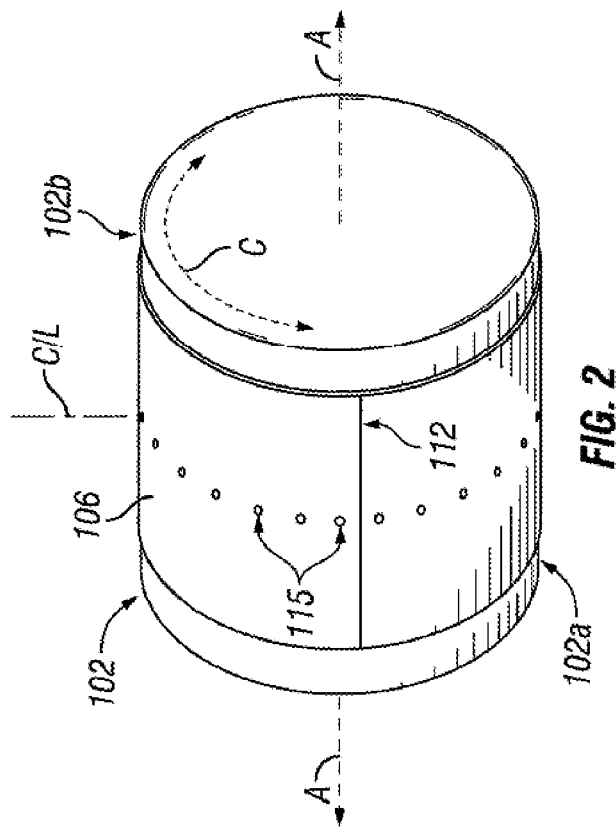
FIG. 2 shows a perspective view of a forming drum amenable for placement of components of an exemplary self-supporting tire thereonto.
Figure 5:
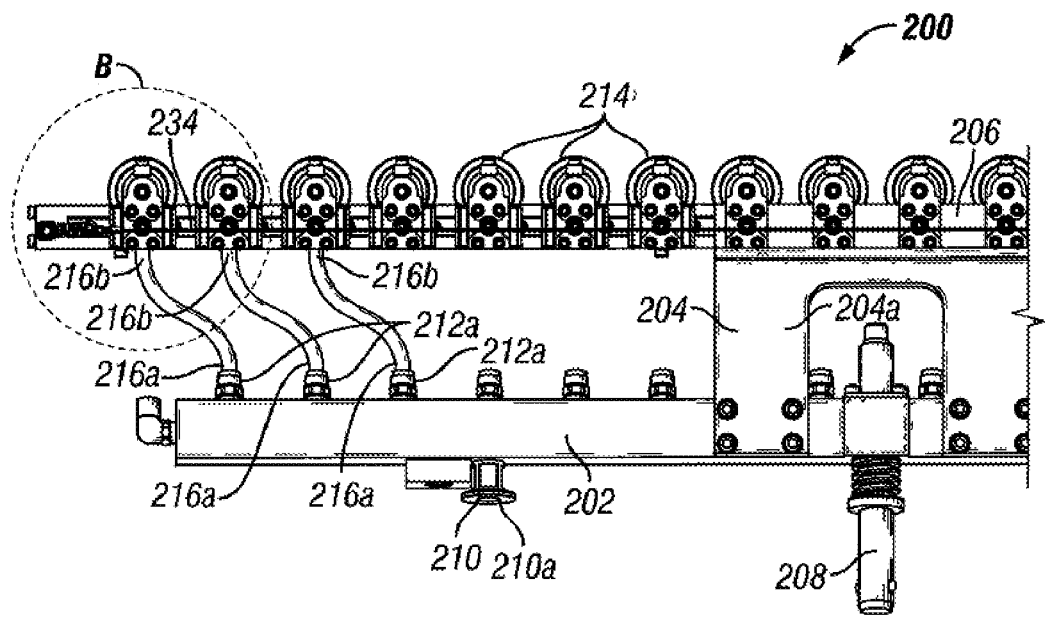
FIG. 5 shows a partial top view of the transporter of FIG. 3
Figure 6:
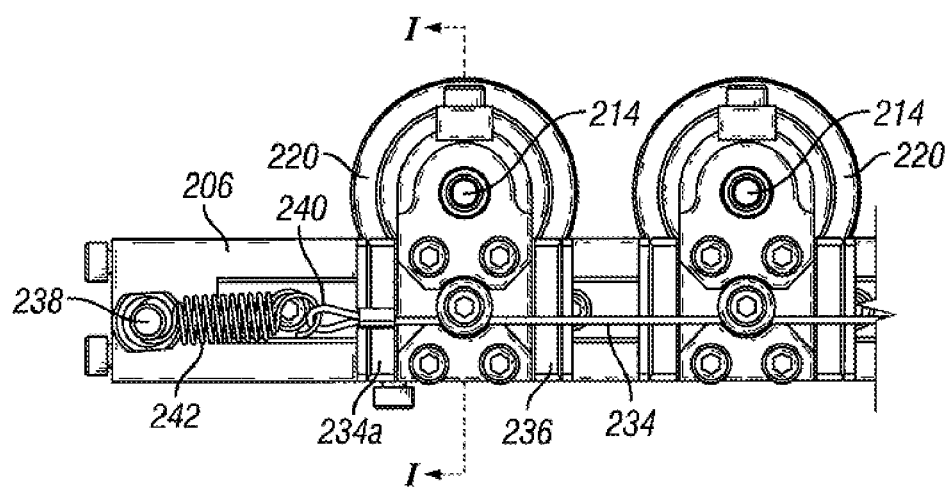
FIG. 6 shows a portion B thereof.
Figure 7:
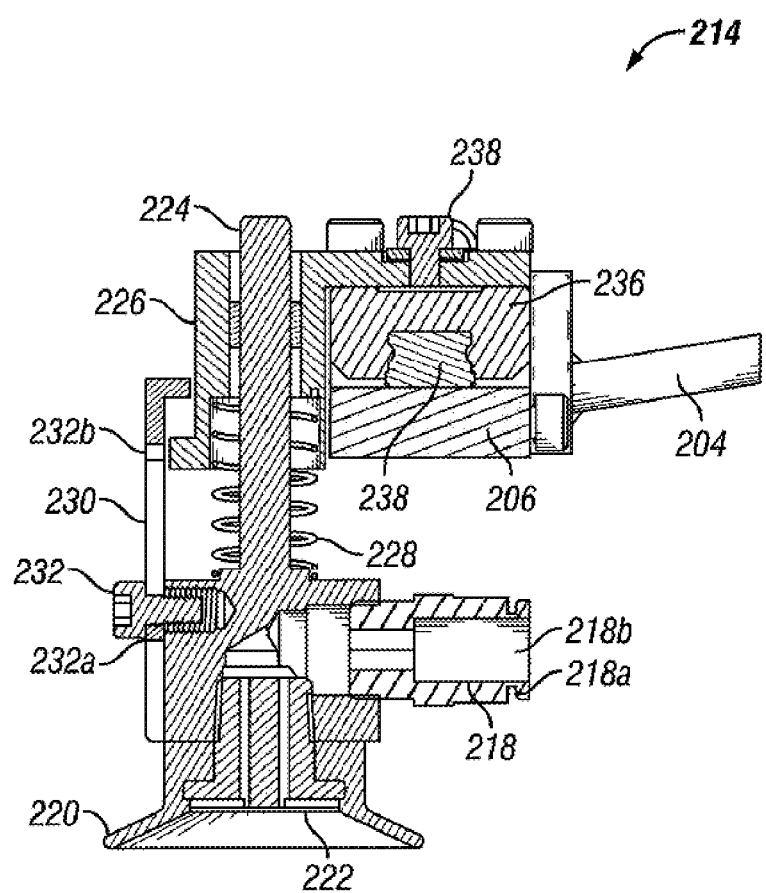
FIG. 7 shows a sectional view along line I-I of FIG. 6.
Figure 8:
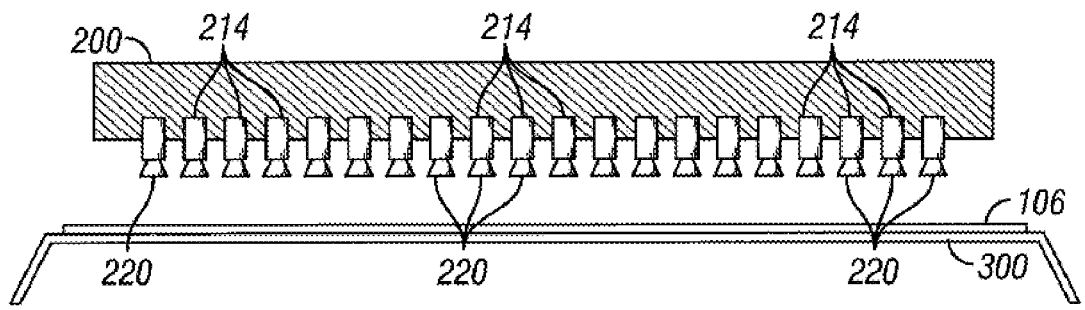
FIG. 8 shows a schematic longitudinal view of the exemplary transporter of FIGS. 3-7 prior to retrieval of a carcass ply thereby.
Figure 9:
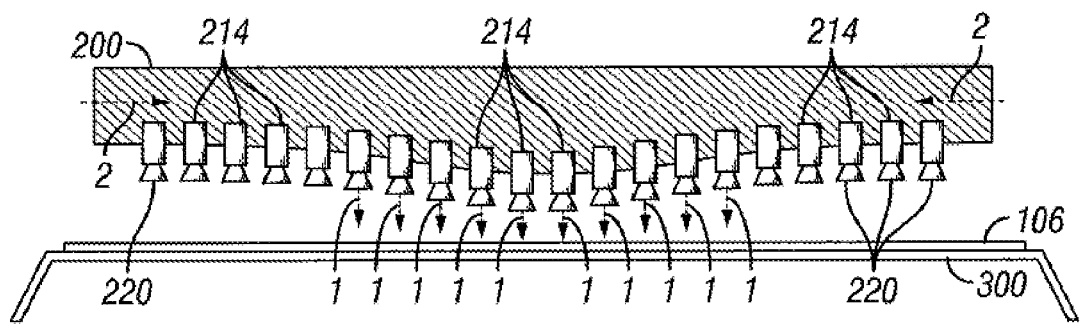
FIG. 9 shows the exemplary transporter of FIG. 8 in a ply retrieval position.
Figure 10:
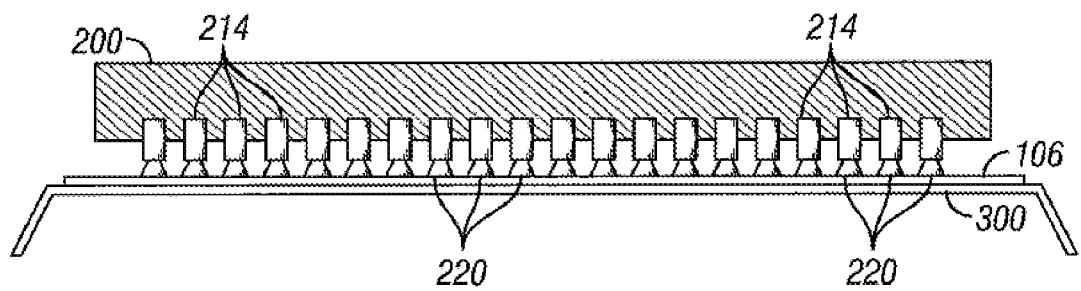
FIG. 10 shows the exemplary transporter of FIGS. 8 and 9 during retrieval of a carcass ply.

Further referring to FIGS. 1 and 2, an air impermeable layer 100 (also known as an "inner liner") is placed on a forming drum 102 and generally centered between opposed sides 102a and 102b thereof (as used herein, "drum," "assembly drum" and "tambour" may be used interchangeably to refer to a circumferentially rotating element having a surface for receipt of one or more tire components during tire manufacture). Drum 102 has a cylindrically-shaped forming surface 102c coextensive with opposed sides 102a, 102b that is substantially flat along an axial direction A and curved along a circumferential direction C (see FIG. 2). Drum 102 is rotatable so as to allow forming surface 102c to receive various components thereon during tire construction. Drum 102 may include various internal features for positioning components placed onto forming surface 102c. While only one layer 100 is illustrated, it is understood that one or more air impermeable layers may be used.

At least a pair of sidewall support inserts 104 may be disposed upon layer 100. Each sidewall support insert 104 is placed at a predetermined relative distance from respective side 102a, 102b (i.e., such the opposing inserts are generally equally spaced about a center line C/L). Sidewall support inserts 104 may assume any shape and size amenable to practice of the present disclosure and are not limited to the exemplary shape and size shown herein. Also, while only a pair of sidewall support inserts 104 is shown, it is understood that more than one pair may be employed (e.g., to increase the sidewall strength of the assembled self-supporting tire).

A carcass ply 106 is disposed relative to layer 100 and inserts 104 as shown, which carcass ply may include respective reinforcing plies 108, 110. As used herein, "ply," "reinforcement ply" and "reinforcing ply" (in both singular and plural forms) may be used interchangeably to refer to one or more reinforcement plies. A cutting implement (not shown) as known in the art directs cutting of plies 108, 110 to form respective leading and trailing edges that meet along a joint 112 (see FIG. 2). Each reinforcement ply 108, 110 includes a plurality of cords and/or other reinforcing features that inure stiffness while allowing the plies to remain substantially non-expandable in an axial direction. Accordingly, in an exemplary embodiment of the presently disclosed invention, plies 108, 110 are placed onto, and between, sidewall support inserts 104 so that they are suspended over forming surface 102c. This creates a temporary cavity 114 extending circumferentially about drum 102 between air impermeable layer 100 and reinforcing ply 108.

As particularly seen in FIG. 2, one or more reinforcing plies may include a plurality of perforations 115 along a circumferential direction C. Each perforation 115 may be centrally positioned, for example, on reinforcing ply 106. In some embodiments, perforations 115 may be located in a crown region of the tire.

While two plies are shown herein, it is understood that a single reinforcing ply or more than two reinforcing plies may also be employed without departing from the scope of the present disclosure. Additionally, where multiple reinforcing plies are used, such plies do not require simultaneous application over drum 102. It is further understood that other components may be added between the application of adjacent reinforcing plies (such as reinforcement plies 108, 110). For example, additional sidewall reinforcement inserts may be disposed axially outward of sidewall support inserts 104 and reinforcing ply 106 subsequently positioned thereover.

Posing of carcass ply 106 is effected so as to avoid modifications to the drum that are dimension specific, thereby accommodating production processes that use multiple drums. Posing may include use of a transporter that is used on automatic equipment to pick up a carcass ply (for example, at or near a leading edge thereof as further described hereinbelow). A transporter is a device that is used on automatic equipment to retrieve a tire component, bring it to the forming drum and place it on a forming surface thereof (e.g., placing the transported tire component directly on the forming drum surface or upon one or more other components already disposed thereon). Examples of such transporter assemblies are disclosed by co-owned and co-pending PCT Publication No. WO2014/090983 filed 13 Dec. 2013 and entitled METHOD AND DEVICE FOR MANUFACTURING A GREEN TYRE, the entire disclose of which is incorporated by reference herein.

As shown by FIGS. 3-12, an exemplary transporter 200 is provided that is amenable for use with the presently described invention. Transporter 200 includes a manifold 202 to which a bar support 204 is affixed for retention of an assembly bar 206 thereby. Bar support 204 is shown as a generally U-shaped member having legs 204a with free extents 204b secured to manifold 202 such that retention pin 208 is centrally disposed therebetween. It is understood that bar support 204 may assume any other suitable geometry and any other equivalent securement configuration may be employed. Retention pin 208, while shown as an adjustable threaded fastener that enables modifiable positioning of transporter 200 relative to any automatic equipment to which it is attached, may include any suitable fastening means amenable with successful practice of the presently disclosed invention.

Referring further to FIGS. 3-7, manifold 202 includes one or more vacuum supply ports 210. Each supply port has an inlet 210a in communication with a vacuum supply source (not shown) as is known in the art for delivery of a vacuum to one or more corresponding vacuum supply fittings 212. Each vacuum supply fitting has an outlet 212a in fluid communication with one or more suction cup assemblies 214. Fluid communication may be established via a conduit such as duct 216 shown in FIGS. 3-5 (although it is understood that other equivalent conduits may be utilized without deviating from the scope of the present disclosure).

Each duct 216 has opposed extents 216a, 216b that establish fluid communication between each supply port outlet 212a and at least one corresponding delivery fitting 218. Each delivery fitting 218 includes a delivery inlet 218a that accommodates unimpeded delivery of a vacuum to a lumen 218b. It is understood that ducts 216 may establish a one-to-one correspondence between each vacuum supply fitting 212 and a corresponding delivery fitting 218. Alternatively, one or more ducts 216 may be bifurcated, trifurcated or otherwise segregated such that one duct serves multiple ports and/or fittings. It is understood that the depicted numbers of vacuum supply fittings 212 and delivery fittings 218 are merely exemplary and that such numbers are modifiable without departing from the scope of the present disclosure.

A vacuum may be supplied via each delivery fitting 218 so as to actuate at least one retention device in communication therewith and actuatably supported by assembly bar 206. As shown in further detail in FIG. 7, such retention device may include an exemplary suction cup assembly 214 that, in operation, exhibits reciprocatable and translational movement relative to assembly bar 206. Assembly bar 206, which is fixed, may support a plurality of suction cup assemblies 214 thereby, although the number of suction cup assemblies is not limited to those presently shown. Suction cup assemblies 214 may be aligned and arranged consecutively so as to substantially cover an entire width of a carcass ply retrieved thereby (e.g., such as exemplary carcass ply 106 described herein with respect to FIGS. 1 and 2). It is contemplated that one or more suction cup assemblies 214 may be added to or removed from assembly bar 206 to adjust for variations in carcass ply dimensions.

In each suction cup assembly 214, a suction cup 220 is in generally coaxial alignment with a suction cup retainer 222 and a slide shaft 224 reciprocatingly accommodated within a slide housing 226. Slide shaft 224 is coaxially disposed relative to a cup extension spring 228 that governs vertical motion of suction cup 220. Such vertical motion is limited by an adjustable stop tab 230 engaging slide housing 226 (and particularly detent 226a thereof). Stop tab 230 is adjustable relative to slide housing 226 so as to accommodate a plurality of dimensions thereby. In some embodiments, a pair of stops 232a, 232b may serve as adjustment limits for stop tab 230, which adjustment limits may be preset to the shape of a selected forming drum surface and thereby accommodate actuation of at least one suction cup assembly between the ply retrieval position and the ply pose position.

Figure 11:
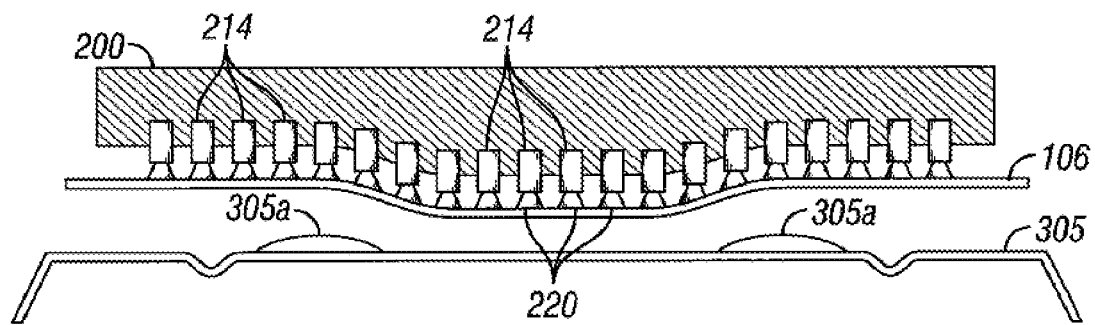
FIG. 11 shows the exemplary transporter of FIGS. 8-10 in a ply pose position.
Figure 12:
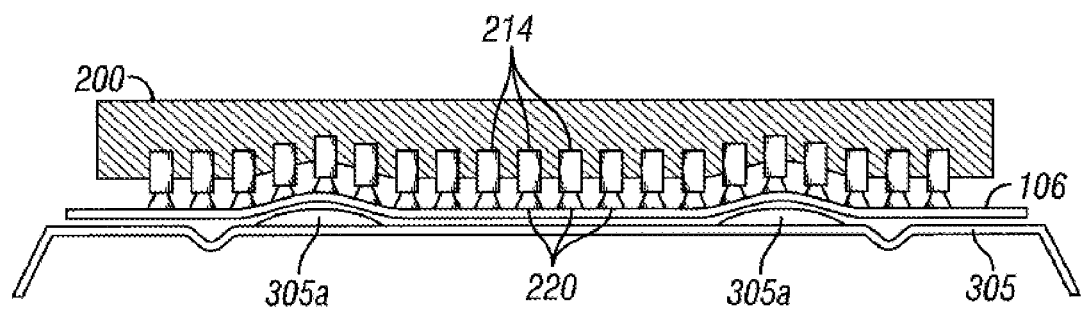
FIG. 12 shows the exemplary transporter of FIGS. 8-11 during posing of the carcass ply along a forming drum surface.

Referring to FIGS. 8-12, transporter 200 changes its profile shape by effecting actuation of each suction cup 220 between a carcass ply retrieval position (also referred to herein as "retrieval position"), wherein carcass ply 106 is retrieved from a generally flat surface 300 (see FIGS. 8-10), and a carcass ply pose position (also referred to herein as "pose position"), wherein carcass ply 106 is posed upon an uneven surface 305 having a profile (see FIGS. 11-12 for an exemplary profiled surface having profiles 305a thereat). A vacuum applied though each delivery fitting 218 effects retrieval of the carcass play in a predictable and reliable manner. It is understood that while the vacuum effectively retrieves carcass ply 106, other means may complement the vacuum, including but not limited to one or more magnets or equivalent retrieval means, as is known in the art.

From the retrieval position, when carcass ply 106 is retrieved from flat surface 300, each cup extension spring 228 is compressed when an automatic mechanism in operating communication with transporter 200 effects downward movement of the transporter toward carcass ply 106 in the direction of arrows 1 (see FIG. 9) (such automatic mechanisms that effect up/down translation are well known in the art and do not form any part of the presently disclosed invention). Consequently, one or more suction cup assemblies 214 are horizontally directed along bearing rail 238 in the directions of arrows 2. Compression of spring 228 consequently effects movement of adjustable stop screw 232 toward stop 232b. Upon lifting of carcass ply 106 from flat surface 300, the carcass ply is held in the profile of uneven surface 305 to which it will be applied (see FIGS. 11 and 12).

As the contour of carcass ply 106 changes from a straight profile to an undulating one, compensation for this change becomes necessary as the carcass ply is shaped. Failure to consider such compensation would undesirably prevent full extension of cup extension springs 228. Slide housing 226 is therefore fastened by at least one lateral return cord 234 to a horizontal slide bearing 236. Slide bearing 236 is actuatably disposed proximate a bearing rail 238 affixed to assembly bar 206. One or more additional fasteners may optionally secure slide housing 226 to slide bearing 236 as is known in the art.

Lateral return cord 234 has a predetermined length coextensive with opposed free extents 232a. Each lateral cord free extent 232a may have a retention means provided thereat for retention by at least one retaining fastener 238. As shown in the figures, such retention means may include an eyelet hook 240 or equivalent structure that is readily secured by a return spring 242 having opposed spring hooks 240a, 240b for selective removable securement of the spring with retaining fastener 238. The retention of lateral return cord 232 by return spring 242 in such a configuration ensures sufficient tension in the lateral return cord, thereby preserving suction cup assemblies 214 in, and returning them to, the retrieval position while facilitating change to an accurate pose position.

Upon application of carcass ply 106 to uneven surface 305, one or more suction cup assemblies 214 are horizontally directed along bearing rail 238. Such horizontal movement is accommodated by lateral return cord 234 and the consequent extension of each return spring 242 to reach the ply pose position (e.g., as shown by example in FIG. 11). Upon release of carcass ply 106 upon uneven surface 305, return springs 242 urge suction cup assemblies 214 to the ply retrieval position (e.g., as shown by example in FIG. 8) in preparation for a subsequent posing cycle.

Each suction cup assembly 214 is independently actuatable relative to any other suction cup assembly and relative to assembly bar 206. Thus, each suction cup assembly 214 has an adjustable height and an adjustable spacing relative to any other suction cup assembly so as to adapt an uneven profile such as that shown in FIGS. 11 and 12. Each suction cup assembly 214 is positionable prior to retrieving a carcass ply such that, upon such retrieval, the carcass ply automatically assumes the uneven profile of the forming surface to which it will be applied. One or more profile contours may be preprogrammed (for example, as by one or more programmable logic controllers, or PLCs) such that a single production session can accommodate identical contours multiple times and/or varying contours in succession.

Transporter 200 is generally fabricated from commercially available hardware and simple machined parts. It is therefore a readily available lightweight complement to existing automatic machines. For example, each of manifold 202, bar support 204, assembly bar 206 and retention pin 208 may be fabricated from materials including but not limited to aluminum, stainless steel, metal, composite and any comparable and/or equivalent material. Suction cup assemblies 214 are easily assembled from commercially available parts and/or parts that are readily machined with minimal temporal and fiscal investment (e.g., such as by rapid prototyping).

Figure 13:
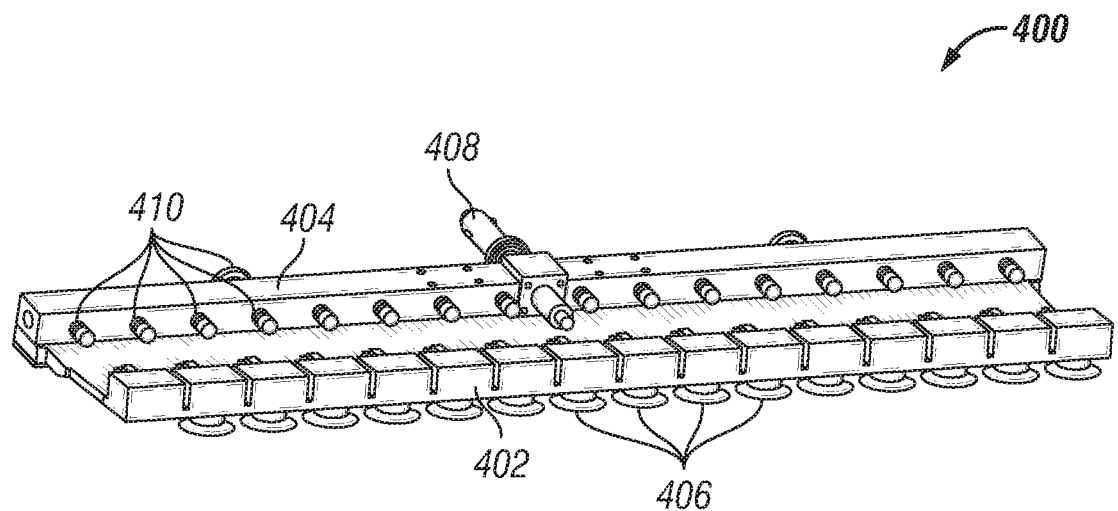
FIGS. 13 and 14 show respective front perspective and longitudinal views of an exemplary carcass ply transporter.
Figure 14:
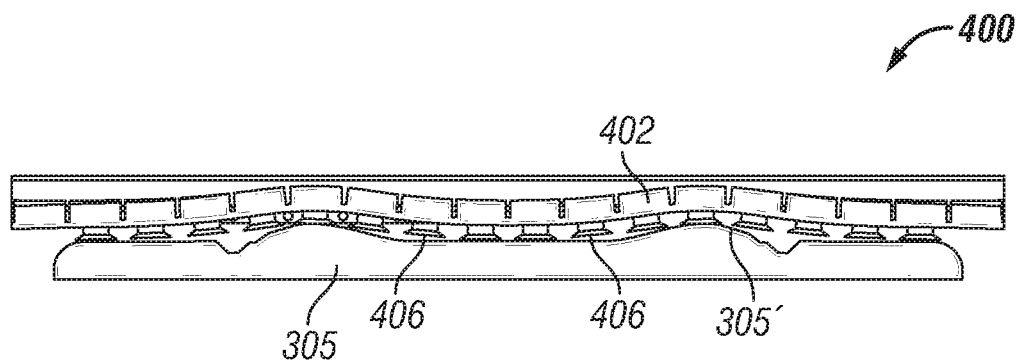

Referring to FIGS. 13 and 14, another exemplary transporter 400 is provided in which a polymer support structure 402 accommodates a plurality of retention devices. Transporter 400 may include a manifold 404 to which polymer support structure 402 is affixed for retention of a plurality of suction cups 406. Polymer support structure is desirably fabricated from a flexible polymer (e.g., one or more types of rubber, polyurethane, etc.), although it is understood that equivalent materials are contemplated that are amenable for use with the present disclosure. Suction cups 406 may be aligned and arranged consecutively so as to substantially cover an entire width of a carcass ply retrieved thereby.

Manifold 404 may include at least one retention pin 408 for securement of transporter 400 to automatic equipment as is known in the art. Manifold 404 may also include a plurality of vacuum supply ports 410. Each vacuum supply port includes an outlet in fluid communication with one or more suction cups 406 and an inlet in communication with a vacuum supply source (not shown) as is known in the art. Each port outlet enables delivery of a vacuum to one or more corresponding suction cups 406 for effective retrieval of one or more carcass plies thereby. The vacuum is delivered by one or more ducts (not shown) in a manner similar to that described hereinabove with respect to transporter 200. It is understood that the number of supply ports 410 depicted herein is merely exemplary and that such number is modifiable without departing from the scope of the present disclosure.

In use, transporter 400 changes a suction cup profile shape by effecting actuation of at least one suction cup 406 between a carcass ply retrieval position, wherein carcass ply 106 is retrieved from a generally flat surface (such as flat surface 300 shown in FIGS. 8-10) and a carcass ply pose position, wherein carcass ply 106 is posed upon an uneven surface 305' having a profile (see FIG. 14). A vacuum applied though each supply port 410 effects retrieval of the carcass play in a predictable and reliable manner. It is understood that while the vacuum effectively retrieves carcass ply 106, other means may complement the vacuum, including but not limited to one or more magnets or equivalent retrieval means, as is known in the art.

From the retrieval position, when the carcass ply (not shown) is retrieved from a flat surface, transporter 400 continuously moves in a downward vertical direction toward uneven surface 305' of the forming drum. Because polymer support structure 402 remains flexible throughout the process, when pressed upon the forming drum, the retrieved carcass ply conforms to the profile of uneven surface 305'. The flexibility of polymer support structure 402 additionally facilitates vertical and horizontal actuation of suction cups 406 to ensure accurate profile conformance as well as immediate returns to the retrieval position to commence subsequent retrieval-posing cycles.

In some embodiments, transporter 400 takes on a predefined profile (e.g., an exemplary profile as shown in FIG. 14) at the onset of a posing cycle. Transporter 400 may be fabricated (e.g. molded) such that the predefined profile is not malleable and therefore suction cups 406 remain in pre-set positions for the duration of use of transporter 400. In such embodiments, one or more transporters 400 may be provided, for example, in a kit having multiple transporter profiles for use with multiple forming drum surfaces. Alternatively, one or more forces may be applied at least at or near a center of a length of transporter 400 to effect the predefined profile shape.

Transporters 200 and 400 are modifiable to apply carcass ply 106 over reinforcement layers up to a thickness as determined by the production process for the self-supporting tire. For example, in some embodiments, transporter 200 applies carcass ply 106 over reinforcement layers having a thickness up to and including 14 mm. Such thickness is provided as merely one example of the modifiability of the presently disclosed invention, and a person of ordinary skill would understand that successful practice of the presently disclosed invention is not limited to such reinforcement layer thicknesses.

Referring to FIGS. 15-20, an exemplary posing cycle is disclosed that incorporates the strategic application of tension to a carcass ply. Such tension is selected for proper positioning of the ply relative to the drum forming surface. As used herein, a "posing cycle" includes one or more methods that are executed for shaping and depositing a tire ply on a drum. It is understood that exemplary methods as disclosed herein, and any variation thereof, are equally effective for both simple structures (e.g., those having an interior liner, two profiled sidewall reinforcement elements and a carcass reinforcement ply) and more complex structures (e.g., those having a plurality of carcass reinforcement plies and two or more profiled sidewall reinforcement elements).

Figure 15:
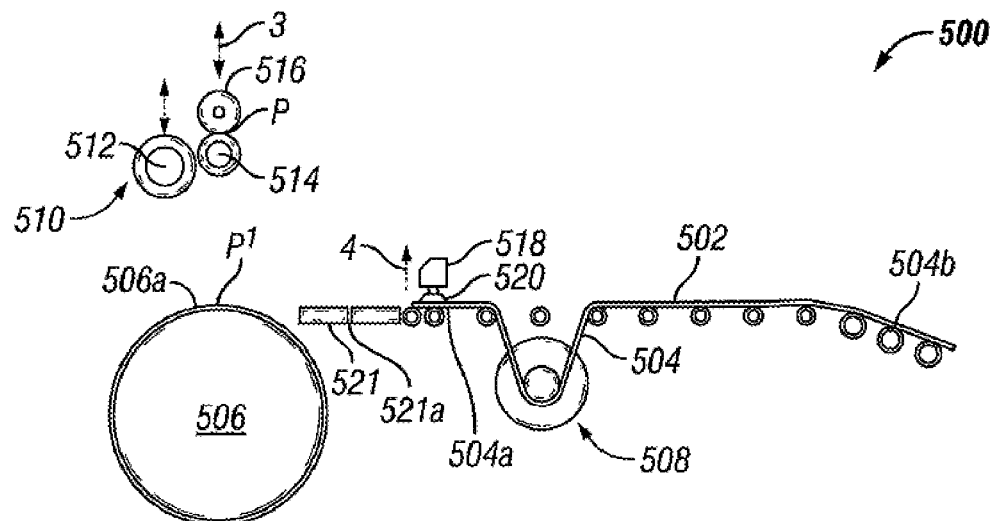
FIGS. 15-20 show an exemplary method of constructing self-supporting tires and an exemplary system used therein with FIGS. 15A and 15B showing front schematic views of exemplary rollers used in such method.

Referring to FIG. 15, a ply positioning and posing system 500 is shown having a belt or roller feeder 502 for carrying at least one carcass ply 504 from an initial location (e.g., a storage depot) toward an assembly drum 506 which may have a configuration commensurate with that of forming drum 102 shown and described herein with respect to FIG. 2 (although a person of ordinary skill understands that any equivalent assembly drum configuration may be employed that is amenable to successful practice of the presently disclosed invention). Drum 506 includes a drum forming surface 506a upon which have been deposited an internal butyl layer and profiled elements of a predetermined thickness.

Carcass ply 504 is shown in the form of a length of ply having an upstream leading edge 504a proximate drum 506 and a downstream trailing edge 504b. Carcass ply 504 has a predetermined width delineated by a pair of opposed lateral edges 504c positioned relative to drum 506 in a manner commensurate with that of lateral edges 102a, 102b shown in FIG. 1. A tension device, such as adjustable brake device 508, allows selective application of a laying tension so as to promote application of ply 504 onto drum forming surface 506a. Adjustable brake device may be a commercially available tension device having selective tension controls. Tension applied to the ply removes excess ply at respective leading and trailing edges 504a, 504b, thereby obviating any undesirable creases prior to posing of subsequent products. Removal of excess material also attenuates any distance between leading edge 504a and drum forming surface 506a, thereby ensuring clearance of a bead wire and accurate posing thereof.

System 500 may include a roller subsystem 510 having one or more of a conforming roller 512, an application roller 514 and a center roller 516, one or more of which is supported by at least one frame as is known in the art. Each roller may be selected from any commercially available industrial roller. Each roller is displaceable in the vertical direction (e.g., see arrow 3 in FIG. 15) in order to come into and out of contact with forming surface 506a as required during the posing cycle, for example, by means of a piston-cylinder unit or like means. Center roller 516 is similarly displaceable relative to application roller 514 at a plane P therebetween. A plane $P^1$ corresponds generally with a plane of contact of ply 504 with drum forming surface 506a. A width of at least one of rollers 512, 514 and 516 may correspond generally to that of ply 504.

Figure 15A:
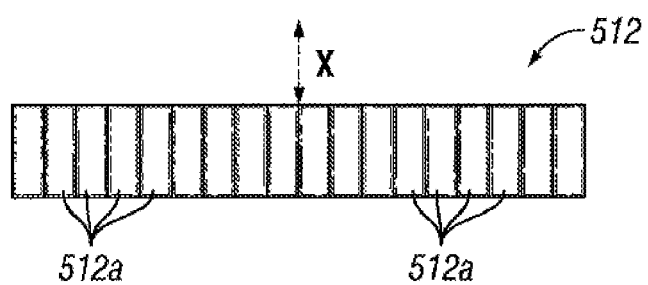

Conforming roller 512 is employed as carcass ply 504 is posed over sidewall reinforcing rubber (e.g., inserts 104 or 305a as shown and described herein) to further conform the ply to drum forming surface 506a. Conforming roller 512 may therefore be a deformable roller of multidisc type as shown in FIG. 15A, formed of a set of discs 512a that are juxtaposed relative to one another and mobile relative to one another in the radial direction. A pneumatic system (and/or one or more equivalents thereof) may be employed to force each disc 512a to move in the radial direction (e.g., in the direction of arrow X as shown in FIG. 15A) until the disc comes into contact with the selected laying profile. In the alternative, a soft roller may be employed, and/or any equivalent thereof (e.g., a foam roller or one or more compressible bladders the elasticity of which is suitable for conformance to the laying profile).

Figure 15B:
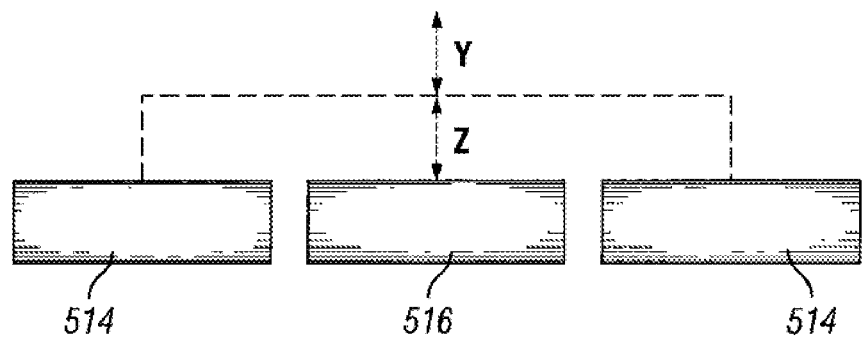

Due to an uneven profile provided along drum forming surface 506a, rolling is optionally segmented in an axial direction on carcass ply 504 such that the ply is subject to pressure in the center thereof and also along sidewall reinforcing rubber. In some embodiments, application roller 514 and center roller 516 may incorporate a minimum segmentation of three sections for anchoring ply 504 along the extent of its width. In an exemplary embodiment shown in FIG. 15B, application roller 514 includes two rollers in communication with one another and vertically reciprocatable (e.g., in the direction of arrow Y) relative to an independently reciprocatable (e.g., in the direction of arrow Z) center roller 516. Ply 504 is pulled forward thereby without distortion at or near leading edge 504a. A center section of the segmentation of three may be selectively removed as ply 504 is posed until termination of the posing cycle, upon which the center section may be reapplied to anchor trailing edge 504b.

Figure 16:
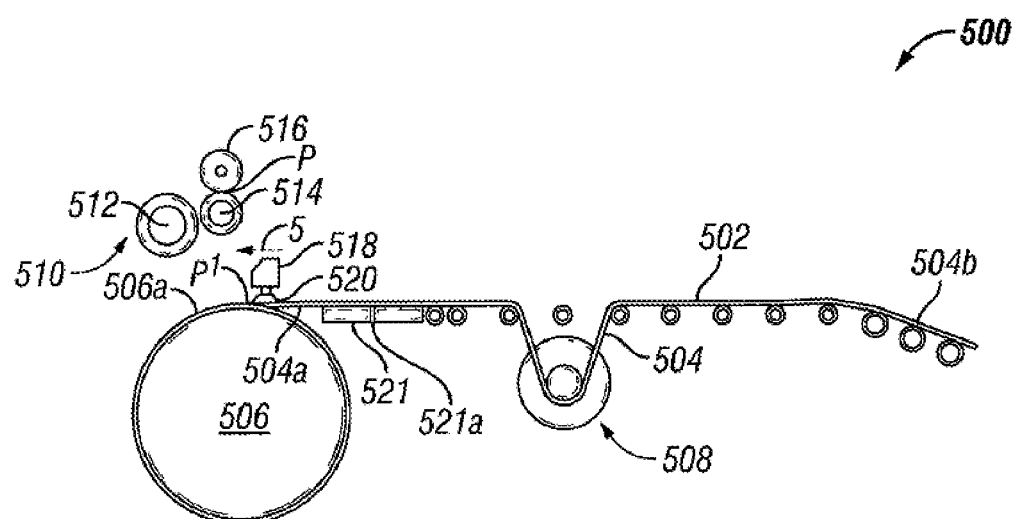

Referring to FIGS. 15 and 16, during a posing cycle, feeder 502 delivers carcass ply 504 upstream toward stationary drum forming surface 506a and particularly toward a contact plane $P^1$. Upon initiation of a posing cycle, roller subsystem 510 is in a ready position elevated above drum 506. Tension is selectively applied to ply 504 by setting adjustable brake device 508 to a value commensurate with a height of sidewall reinforcing rubber (e.g., a height of inserts 305a as described and shown with respect to FIGS. 11 and 12).

Upon initiation of a posing cycle, at least one transporter 518 starts a laying operation by gripping leading edge leading edge 504a. Transporter 518 may be selected from transporter 200 and transporter 400 as described and shown herein, although it is understood that another amenable transporter may be amenable to practice of the presently disclosed methods. Gripping is effected by one or more gripping assemblies, including one or more suction cups 520, each of which may be controllably displaceable in both lateral and longitudinal directions. One or more suction cups 520 may remain stationary while the remaining suction cups are displaced laterally and/or longitudinally. The distance between successive suction cups 520 may be adjusted such that the suction cups effect sufficient retention and tension along a width of ply 504 during the posing cycle.

It is understood that transporter 518 may simultaneously grip the entire width of ply leading edge 504a for the duration of transfer of ply 504. Suction cups 520 may be distributed along one or more predetermined gripping sectors of ply 504, wherein each gripping sector may by independently gripped by a selected number of gripping assemblies. Transporter 518 may deposit in succession a central portion of ply 504 and then the axial edges thereof (for example, by release of suction cups 520 in a predetermined order of succession).

Still referring to FIGS. 15 and 16, transporter 518 lifts leading edge 504a along a width thereof (see arrow 4) and transfers the ply toward contact plane $P^1$ (see arrow 5). Transporter 518 transports ply 504 across a cutting surface 521 having a cutting corridor 521a that accommodates one or more cutting members (not shown) as further described herein. Upon alignment of leading edge 504a with contact $P^1$, transporter 518 approaches drum forming surface 506a and deposits ply 504 generally at the level of contact plane $P^1$ proximate application roller 514. In this manner, the reinforcement cords of ply 504 are aligned in the axial direction. Roller subsystem 510 remains in the ready position, and drum 506 remains stationary.

Figure 17:
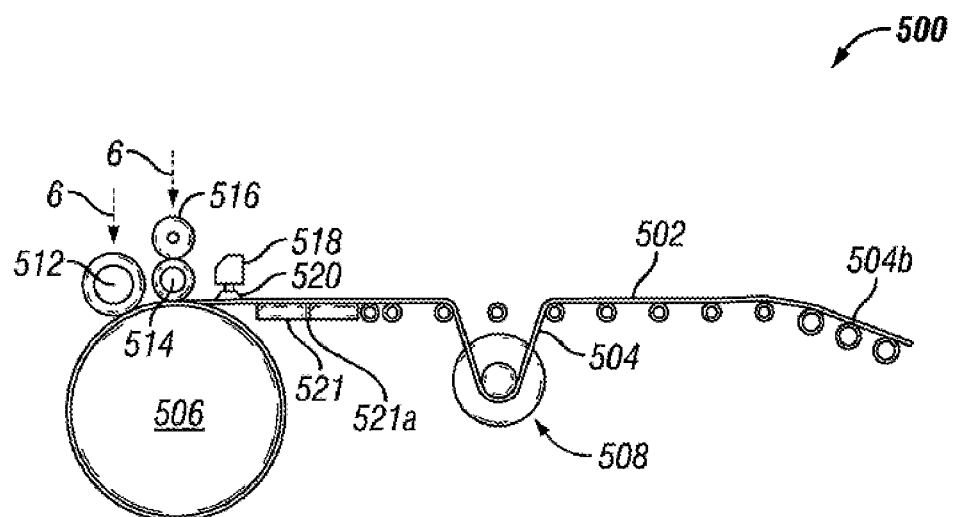
Figure 18:
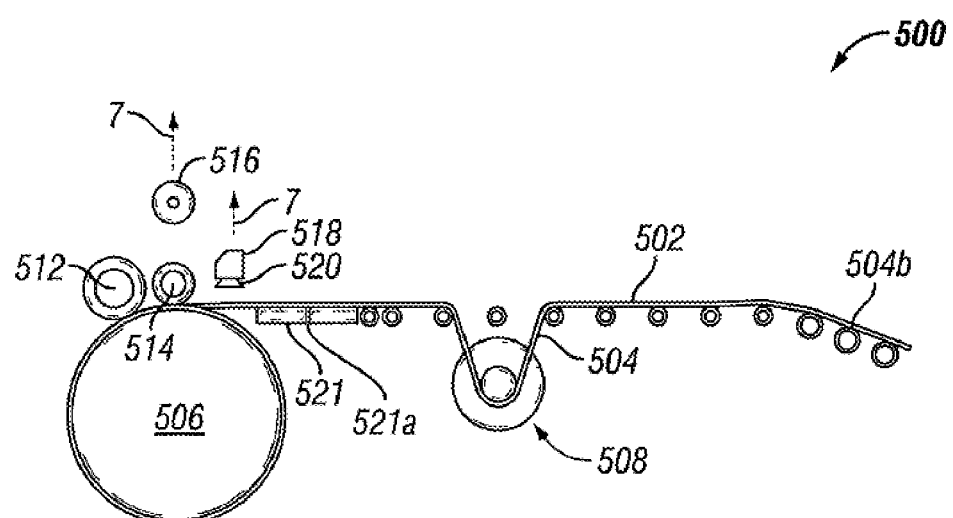
Figure 19:
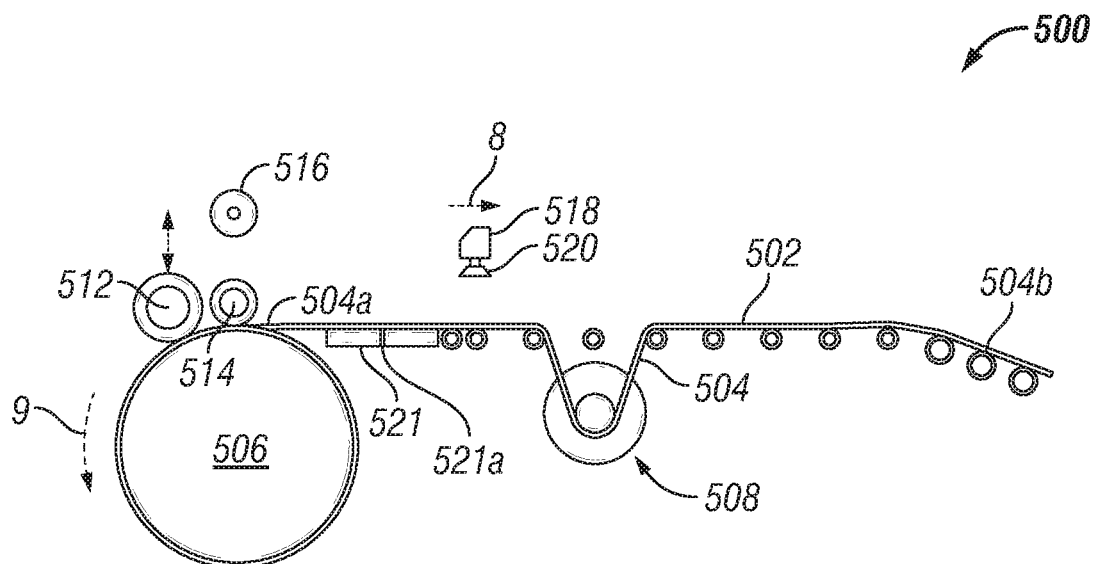

Referring further to FIGS. 17-19, all rollers in roller subsystem 510 descend toward drum 506 (see arrows 6) such that application roller 514 secures leading edge 504a thereby. After deposit and release of leading edge 504a, center roller 516 ascends as does transporter 518 (see arrows 7). Transporter 518 returns upstream past cutting surface 521 and toward adjustable brake device 508 (see arrow 8), upon which return drum 506 initiates circumferential movement (see arrow 9). The speed of rotation of drum 506 desirably remains constant such that the speed of feeder 502 may be regulated accordingly.

The rotation of drum 506 advances ply 504 to a cut position relative to cutting surface 521, whereupon rotation of drum 506 ceases. A cutting tool (not shown) is located upstream of drum 506 so as to cut carcass ply 504 and thereby obtain a desired ply length. The cutting tool may include a cutting assembly as known in the art, for example, as by a floating blade. In some embodiments, two knives are provided in alignment with the same reinforcement cord and drawn across the width of ply 504 to effect cutting thereof. Movement of the knives is guided along cutting corridor 521a such that the knives translate along a width of ply 504. Translation may be effected by one or more translation means as is known in the art (e.g., one or more of a linear actuator, a servo motor, a pneumatic or hydraulic cylinder and any equivalent and combination thereof). During a pose cycle, cutting is effected after the upstream return of transporter 518 and passage thereof over cutting surface 521, whereupon the ply is sufficiently secured to ensure a precise cut thereof.

Figure 20:
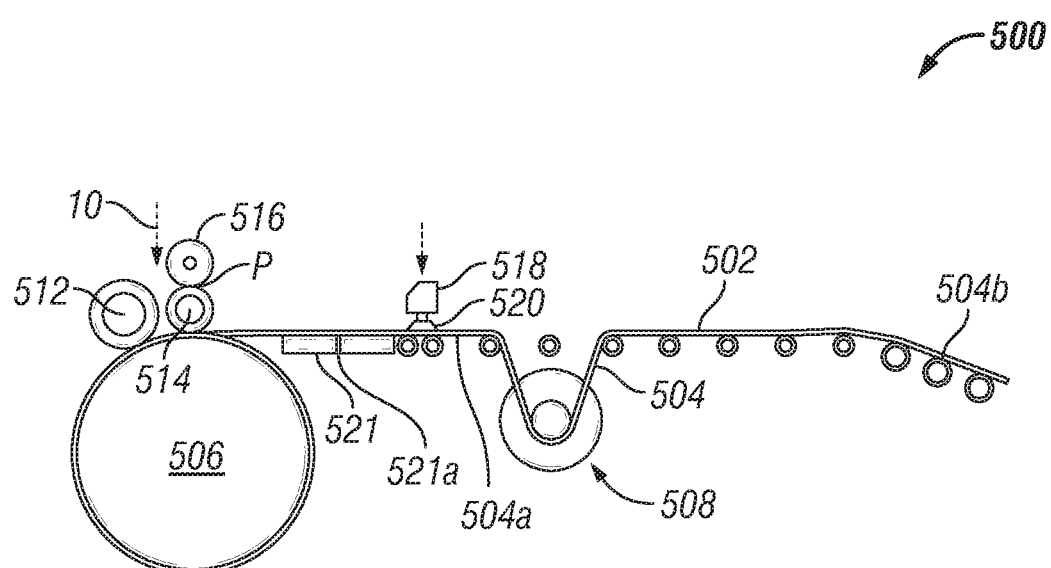

After cutting of ply 504, center roller 516 descends to effect contact with application roller 514 at plane P (see FIG. 20, arrow 10). Drum 506 circumferentially advances to a joint press position such that joining of two ply extents does not cause, at the joint, a material portion that is thicker than the ply material thickness (e.g., due to overlap). In this manner, an edge-to-edge joining of the two ply edges is precisely effected. At the end of the pose cycle, roller subsystem 510 returns to the ready position (e.g., as shown and described with reference to FIG. 16) and transporter 518 is downstream of drum 506 proximate ply 504 in preparation for the initiation of the subsequent pose cycle.

One or more controllers or control systems (collectively "controllers") may determine the instructions to drive the various components of system 500 (e.g., according to the posing cycle, tension values, measured values and correction algorithms). Such controllers may also synchronize a longitudinal advance of the ply as determined by circumferential movement of the drum so as to strategically apply tension during the cycle. These controllers may communicate with one or more sensors (e.g., to detect leading edge 504a) and one or more timers as is known in the art.

It is understood that the present disclosure contemplates one or more systems for manufacturing a plurality of self-supporting tire configurations. Each such system may include a series of posts, one or more of which is selected to execute one or more steps of the presently disclosed methods. Two or more posts may perform identical steps in accordance with current production requirements to support modularity of production capacity.

One or more networked devices may be implemented with the presently disclosed systems, e.g., in a cluster or other distributed computing system. The network may be a LAN, a WAN, a SAN, a wireless network, a cellular network, radio links, optical links and/or the Internet, although the network is not limited to these network selections. Accompanying interactive software applications may be downloaded on a desktop or uploaded from a remote site onto a mobile device. Instructions for use of the software applications may also be included along with resources for accessing any remote platforms that provide one or more users with an interface for collaboration with others. It is contemplated that a mobile device may be employed that has the software applications pre-loaded for ready use.

A server may be further configured to facilitate communication between at least one system as presently disclosed and one or more of the networked devices. A database may be built and accessed that includes stored data (e.g., tire types and sizes, availability of carcass plies, sequence of product assembly, etc.) and calculated data forecasts that can be generated for intended manufacturing integrity.

The presently disclosed inventions obviates modifications to a forming drum that may be necessary to accommodate precision pose of the carcass ply during production of self-supporting tire systems. The relatively thick product that is added to a tire sidewall is typically posed on a forming drum just after posing of a tire inner liner (for example, a butyl inner liner). The carcass ply, being posed directly thereafter, is desirably posed on a smooth surface that is attained by modifying a forming drum by creating grooves therearound. The grooves accommodate the thick reinforcement product to ensure a smooth surface. Such modifications are dimension specific and therefor incur temporal and fiscal costs, particularly in those processes that employ multiple drums. The presently disclosed inventions avoid such costs by initiating pose of the carcass ply over the inner liner and thick reinforcement material on a standard drum. In this manner, a variety of self-supporting tire systems are readily produced by existing forming drum systems without compromising the performance benefits thereof and without significant capital expenditures.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned that perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A transporter for retrieving at least one reinforcing ply and conforming the at least one reinforcing ply to a forming surface of a rotatable forming drum having axial and circumferential directions and with the forming surface being coextensive with a pair of opposed sides and having one or more tire components disposed thereon, the transporter comprising:
   a manifold including one or more supply ports each having a supply port inlet in communication with a vacuum supply source and a supply port outlet for delivery of a vacuum to multiple suction cup assemblies supported by an assembly support bar, with each suction cup assembly including a suction cup in generally coaxial alignment with a suction cup retainer and each suction cup being reciprocatably and translationally positionable between a ply retrieval position, in which the at least one reinforcing ply is retrieved from a generally even surface, and a ply pose position, in which the at least one reinforcing ply assumes a profile shape of the forming surface of the drum before posing of the at least one reinforcing ply on the one or more tire components;
   wherein each suction cup assembly has a slide housing, and wherein the slide housing is fastened to a slide bearing by at least one lateral return cord and the slide bearing is actuatably disposed proximate a bearing rail affixed to the assembly support bar, wherein the at least one lateral return cord spans across the multiple suction cup assemblies and is biased by a return spring to urge the multiple successive suction cup assemblies reciprocatably and translationally from the ply pose position to the ply retrieval position.

2. The transporter of claim 1, further comprising at least one conduit having opposed extents that establish fluid communication between each supply port outlet and at least one corresponding delivery fitting so as to actuate at least one suction cup assembly upon delivery of the vacuum thereto.

3. The transporter of claim 2, wherein each suction cup assembly includes a slide shaft reciprocatingly accommodated within the slide housing and coaxially disposed relative to an extension spring that governs vertical motion of the suction cup.

4. The transporter of claim 3, wherein the vertical motion is limited by an adjustable stop tab that engages at least a portion of the slide housing.

5. The transporter of claim 4, further comprising a pair of stops that provide adjustment limits for the stop tab wherein the adjustment limits are optionally preset to accommodate actuation of the multiple suction cup assemblies between the ply retrieval position and the ply pose position.

6. The transporter of claim 3, wherein each lateral return cord has opposed free extents with one free extent having retention means provided thereat for retention by the corresponding return spring that urges each suction cup toward the ply retrieval position.

7. The transporter of claim 1, wherein the one or more tire components include at least one of:
   one or more air impermeable layers laid onto the forming surface of the drum; and
   at least a pair of sidewall support inserts disposed upon the one or more air impermeable layers with at least one sidewall support insert placed at a predetermined relative distance from each opposed side of the drum.

8. The transporter of claim 7, further comprising an adjustable fastening means for modifiable positioning of the transporter relative to any equipment to which the transporter is attached.

9. The transporter of claim 1, wherein the manifold is affixed to a bar support for retention of the assembly support bar thereby.

10. The transporter of claim 1, wherein the transporter is in signal communication with at least one programmable controller in which one or more profile shapes are programmed such that the ply pose position is selectable from a plurality of profile shapes.

11. A method of assembling tire components for the manufacture of self-supporting tires, comprising:
   laying one or more air impermeable layers onto a forming surface of a rotatable forming drum having axial and circumferential directions and with the forming surface being coextensive with a pair of opposed sides;
positioning at least a pair of sidewall support inserts onto the one or more air impermeable layers with at least one sidewall support insert placed at a predetermined relative distance from each opposed side; and providing at least one transporter according to claim 1 for retrieving at least one reinforcing ply and placing the at least one reinforcing ply over the at least one pair of sidewall support inserts on the drum.

12. The method of claim 11, further comprising performing one or more posing cycles for shaping and depositing the at least one reinforcing ply on the drum, with each posing cycle including at least one of:

providing a tension device having a plurality of tension values for selective application of a laying tension of the at least one reinforcing ply;

providing a feeder for carrying the at least one reinforcing ply between an initial location and the drum;

providing a roller subsystem having one or more of a conforming roller, an application roller and a center roller, each of which is vertically displaceable;

transferring the at least one reinforcing ply from the feeder to the drum;

cutting a selected length of the at least one reinforcing ply; and joining opposed extents of the at least one reinforcing ply such that the joining does not create a material portion that is thicker than a thickness of the at least one reinforcing ply.

13. The method of claim 11, wherein the multiple suction cup assemblies are directed toward the ply pose position upon retrieval of the at least one reinforcing ply and toward the ply retrieval position upon release of the at least one reinforcing ply during posing thereof on the forming surface.

14. The method of claim 11, further comprising programming one or more profile shapes into at least one programmable controller in signal communication with the transporter such that the ply pose position is selectable from a plurality of profile shapes.

15. A transporter for retrieving at least one reinforcing ply and conforming the at least one reinforcing ply to a forming surface of a rotatable forming drum having axial and circumferential directions and with the forming surface having one or more tire components disposed thereon, the transporter comprising:

a manifold including one or more supply ports each having a supply port inlet in communication with a vacuum supply source and a supply port outlet for delivery of a vacuum to multiple suction cup assemblies, with each suction cup assembly including a suction cup in generally coaxial alignment with a suction cup retainer and all of the suction cups that obtain the vacuum being reciprocatably and translationally positionable between a ply retrieval position, in which the at least one reinforcing ply is retrieved from a generally even surface, and a ply pose position, in which the at least one reinforcing ply assumes a profile shape of the forming surface and the one or more tire components of the drum before posing of the at least one reinforcing ply on the one or more tire components;

wherein each suction cup assembly has a slide housing, and wherein the slide housing is fastened to a slide bearing by at least one lateral return cord and the slide bearing is actuatably disposed proximate a bearing rail affixed to the assembly support bar, wherein the at least one lateral return cord spans across the multiple suction cup assemblies and is biased by a return spring to urge the multiple successive suction cup assemblies reciprocatably and translationally from the ply pose position to the ply retrieval position.

16. A transporter for retrieving at least one reinforcing ply and conforming the at least one reinforcing ply to a forming surface of a rotatable forming drum having axial and circumferential directions and with the forming surface being coextensive with a pair of opposed sides and having one or more air impermeable layers and at least one pair of sidewall supports thereon, the transporter comprising:

a manifold including one or more supply ports each having a supply port inlet in communication with a vacuum supply source and a supply port outlet for delivery of a vacuum to multiple suction cup assemblies supported by an assembly support bar, with each suction cup assembly including a suction cup in generally coaxial alignment with a suction cup retainer and each suction cup being reciprocatably and translationally positionable between a ply retrieval position, in which the at least one reinforcing ply is retrieved from a generally even surface, and a ply pose position, in which the at least one reinforcing ply assumes a profile shape of the forming surface, one or more air impermeable layers, and at least one pair of sidewall supports, before posing of the at least one reinforcing ply on the one or more tire components;

wherein each suction cup assembly includes a slide shaft reciprocatingly accommodated within a slide housing and coaxially disposed relative to an extension spring that governs vertical motion of the suction cup, wherein the vertical motion is limited by an adjustable stop tab that engages at least a portion of the slide housing; and a pair of stops that provide adjustment limits for the stop tab that are optionally preset to accommodate actuation of the multiple suction cup assemblies between the ply retrieval position and the ply pose position, wherein the slide housing is fastened to a slide bearing by at least one lateral return cord and the slide bearing is actuatably disposed proximate a bearing rail affixed to the assembly support bar;

wherein each suction cup assembly has a slide housing, and wherein the slide housing is fastened to a slide bearing by the at least one lateral return cord and the slide bearing is actuatably disposed proximate a bearing rail affixed to the assembly support bar, wherein the at least one lateral return cord spans across the multiple suction cup assemblies and is biased by a return spring to urge the multiple successive suction cup assemblies reciprocatably and translationally from the ply pose position to the ply retrieval position.

* * * * *